(12) United States Patent
Mueckenheim et al.

(10) Patent No.: US 8,005,059 B2
(45) Date of Patent: Aug. 23, 2011

(54) WIRELESS COMMUNICATIONS NETWORK INCORPORATING VOICE OVER IP USING SHARED SUPPLEMENTAL SPREADING CODES

(75) Inventors: Jens Mueckenheim, Nuremberg (DE); Anil M Rao, Cedar Knolls, NJ (US); Mirko Schacht, Nuremberg (DE)

(73) Assignee: Alcatel Lucent, Paris (FR)

( * ) Notice: Subject to any disclaimer, the term of this patent is extended or adjusted under 35 U.S.C. 154(b) by 358 days.

(21) Appl. No.: 11/213,376

(22) Filed: Aug. 26, 2005

(65) Prior Publication Data

US 2007/0049307 A1  Mar. 1, 2007

(51) Int. Cl.
*H04B 7/216* (2006.01)

(52) U.S. Cl. ........ 370/342; 370/335; 370/336; 370/341; 370/431; 370/441; 370/479; 455/450; 455/451; 455/452.1; 455/452.2

(58) Field of Classification Search .......... 370/320, 370/338, 342, 329, 335, 431, 441, 336, 341, 370/436, 442, 443, 478, 479, 480, 535, 536, 370/537, 538; 455/450, 451, 452.2, 466
See application file for complete search history.

(56) References Cited

U.S. PATENT DOCUMENTS

| | | | | |
|---|---|---|---|---|
| 5,511,072 A * | 4/1996 | Delprat | ............ | 370/336 |
| 5,734,646 A | 3/1998 | I et al. | ............ | 370/335 |
| 5,987,326 A * | 11/1999 | Tiedemann et al. | ......... | 455/442 |
| 6,377,809 B1 * | 4/2002 | Rezaiifar et al. | ............ | 455/455 |
| 6,393,008 B1 * | 5/2002 | Cheng et al. | ............ | 370/338 |
| 6,490,268 B1 | 12/2002 | Lee et al. | ............ | 370/342 |
| 6,625,137 B1 * | 9/2003 | Kang | ............ | 370/338 |
| 6,754,189 B1 * | 6/2004 | Cloutier et al. | ............ | 370/329 |
| 6,799,043 B2 * | 9/2004 | Tiedemann et al. | ......... | 455/450 |
| 6,804,219 B2 * | 10/2004 | Koo et al. | ............ | 370/335 |
| 6,819,660 B2 * | 11/2004 | Khare et al. | ............ | 370/342 |
| 6,920,119 B2 * | 7/2005 | Rinchiuso | ............ | 370/329 |
| 6,950,873 B2 * | 9/2005 | Jain et al. | ............ | 709/228 |
| 6,993,338 B2 | 1/2006 | Lee et al. | ............ | 455/442 |
| 7,054,293 B2 | 5/2006 | Tiedemann et al. | ......... | 370/335 |
| 7,254,121 B2 * | 8/2007 | Kim et al. | ............ | 370/335 |
| 7,274,682 B2 * | 9/2007 | Lee | ............ | 370/348 |

(Continued)

FOREIGN PATENT DOCUMENTS

| WO | 98/35525 | 8/1998 |
|---|---|---|
| WO | WO 98/35525 | 8/1998 |

OTHER PUBLICATIONS

Notification of Transmittal, 2 pages.

(Continued)

*Primary Examiner* — Olumide T Ajibade Akonai
(74) *Attorney, Agent, or Firm* — David M. LaBruno (57) ABSTRACT

Embodiments provided include a method for transmitting a packet to a receiver over primary and supplemental channels in a wireless communication network. Indications of a primary code and a set of N supplemental codes assigned to the receiver are communicated over a control channel. When it is determined that a packet should be transmitted over a supplemental channel, a first portion of the packet and a supplemental channel indicator are transmitted over a same single packet transmission time interval on the primary channel and a second portion of the packet is transmitted over the same single packet transmission time interval on the supplemental channel corresponding to the supplemental channel indicator. The supplemental channel uses an assigned specific supplemental code belonging to the set of N supplemental codes assigned to the receiver. When the packet should not be transmitted over a supplemental channel, the packet is transmitted over the primary channel.

16 Claims, 4 Drawing Sheets

U.S. PATENT DOCUMENTS

| | | | | |
|---|---|---|---|---|
| 7,356,000 | B2 * | 4/2008 | Oprescu-Surcobe et al. | 370/329 |
| 7,372,836 | B2 * | 5/2008 | Hwang et al. ................. | 370/335 |
| 7,453,860 | B2 * | 11/2008 | Hogberg et al. ............. | 370/341 |
| 2002/0064145 | A1 | 5/2002 | Khare et al. .................. | 370/342 |
| 2004/0100937 | A1 * | 5/2004 | Chen ............................. | 370/345 |
| 2005/0036461 | A1 | 2/2005 | Keil et al. ..................... | 370/329 |

OTHER PUBLICATIONS

International Search Report, PCT/US2006/032474, Aug. 18, 2006, 4 pages.

"Written Opinion of the International Searching Authority," PCT/US2006/032474, 5 pages.

Notification of Transmittal of International Search Report, PCT/US2006/032474, dated Feb. 9, 2007, 2 pages.

International Search Report, PCT/US2006/03247, dated Feb. 9, 2007, 4 pages.

Written Opinion of the International Searching Authority, PCT/US2006/032474, dated Feb. 9, 2007, 5 pages.

* cited by examiner

WIRELESS COMMUNICATIONS NETWORK INCORPORATING VOICE OVER IP USING SHARED SUPPLEMENTAL SPREADING CODES

RELATED APPLICATION

Related subject matter is disclosed in the following application filed concurrently and assigned to the same assignee hereof: U.S. patent application Ser. No. 11/213,383 entitled, "Handoffs in Wireless Communications Network Incorporating Voice Over IP Using Shared Supplemental Spreading Codes," inventors Rainer Bachl, Jens Mueckenheim, Anil Rao and Mirko Schacht, now abandoned.

FIELD OF THE INVENTION

The present invention relates generally to Internet Protocol applications and, in particular, to Voice over Internet Protocol (VoIP) in a wireless communication system.

BACKGROUND

Incorporating Voice over Internet Protocol (VoIP) service into wireless communications networks, such as wireless communications networks based on the well-known third generation Universal Mobile Telecommunications System (UMTS) technology, simplifies core network design and adds new and valuable services compared to traditional circuit switch (CS) voice. However, VoIP also inherently adds additional overhead in the form of large headers and signaling, thereby reducing system capacity.

Figure 1:
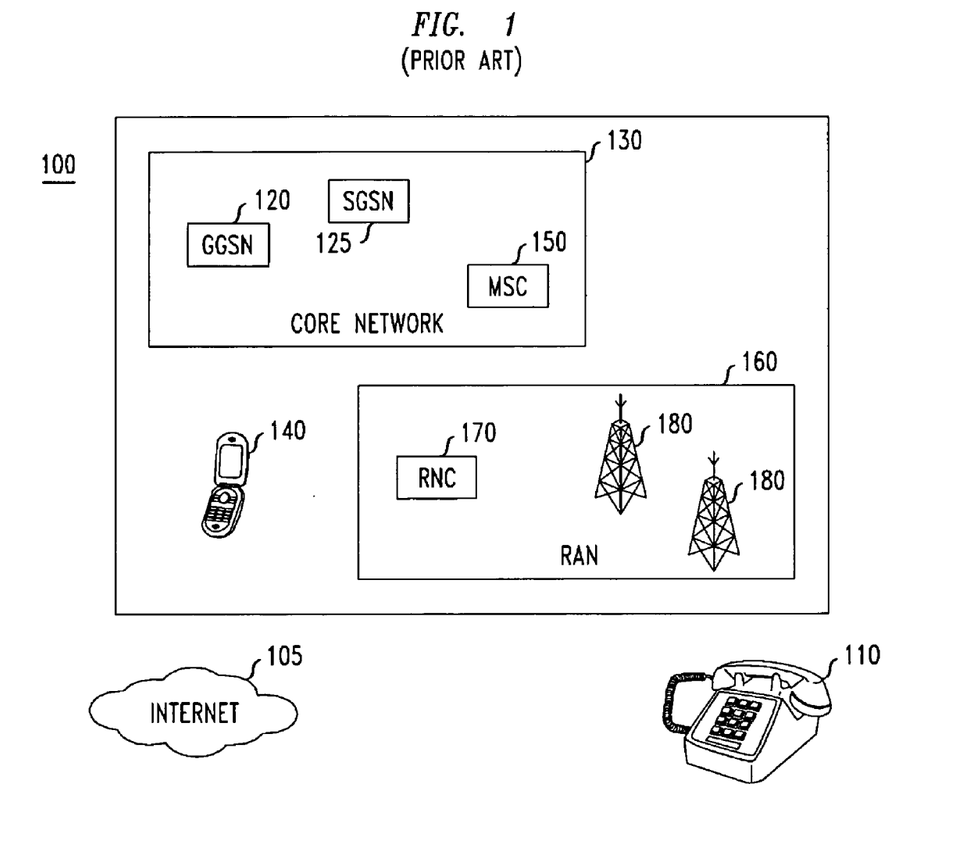
FIG. 1 depicts a Universal Mobile Telecommunications System (UMTS) based wireless communications system, the internet and a Voice over Internet Protocol (VoIP) phone in accordance with the prior art.

FIG. 1 depicts a UMTS based wireless communications system 100, internet 105 and a VoIP phone 110 in accordance with the prior art. Wireless communications system 100 comprises at least core network 130, Radio Access Network (RAN) 160, and User Equipment (UE) or mobile station 140. The core network 130 includes Gateway GPRS Support Node (GGSN) 120, Serving GPRS Support Node (SGSN) 125, and Mobile Switching Center (MSC) 150. GGSN 120 is an interface between internet 105 and core network 130, while SGSN 125 is an interface between core network 130 and RAN 160. The Radio Access Network (RAN) 160 includes one or more Radio Network Controller (RNC) 170 and one or more Node B (or base station) 180.

Figure 2:
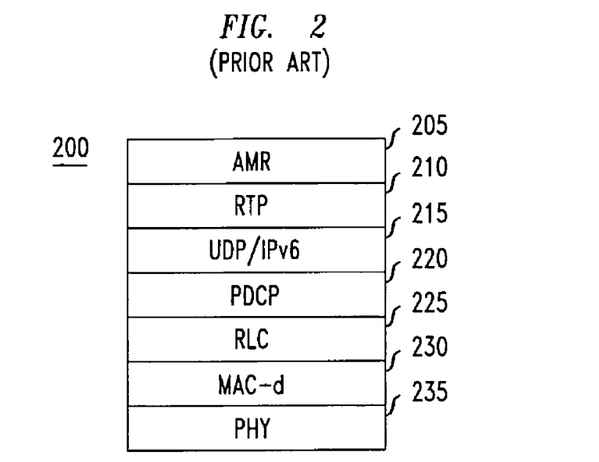
FIG. 2 depicts a protocol stack used for a VoIP call between the VoIP phone and a User Equipment (UE) in accordance with the prior art UMTS based wireless communications network.

FIG. 2 depicts a protocol stack 200 used for a VoIP call between VoIP phone 110 and UE 140 in accordance with the prior art UMTS based wireless communications network 100. The VoIP call being processed in the PS domain of UMTS-based wireless communications system 100. In some system deployments, VoIP phone 110 may be an electronic device that converts a Public Switched Telephone Network (PSTN) call into a VoIP call. In other deployments, the PSTN or wireless communications network may have an Inter-Working Function (IWF) or Media GateWay (MGW) that converts a PSTN call into a VoIP call. As shown in FIG. 2, protocol stack 200 includes an Adaptive Multi-Rate (AMR) layer 205, a Real Time Protocol (RTP) layer 210, a User Datagram Protocol/Internet Protocol version 6 or another version of Internet Protocol, such as version 4 (UDP/IPv6) layer 215, a Packet Data Convergence Protocol (PDCP) layer 220, a Radio Link Control (RLC) layer 225, a dedicated Medium Access Control (MAC-d) layer 230 and a PHYsical (PHY) layer 235. AMR layer 205, RTP layer 210 and UDP/IPv6 layer 215 being implemented at VoIP phone 110. PDCP layer 220, RLC layer 225 and Mac-d layer 230 being implemented at RNC 170. And PHY layer 235 being implemented at Node B 180. Note that although UDP/IPv6 layer 215 is being shown as a single layer, its actual implementation would probably be as two separate UDP and IPv6 layers.

For illustration purposes, suppose speech information is being sent from VoIP phone 110 to UE 140. At VoIP phone 110, speech is encoded in AMR layer 205 (via an AMR codec) to produce a speech frame having 159 speech bits. In RTP layer 210, a RTP payload is formed by adding to one or more speech frames a 4 bit Codec Mode Request (CMR) field, a 6 bit Table Of Contents (TOC) field for each speech frame in the RTP payload, and padding bits for purposes of octet alignment. For an AMR 7.95 kbps codec with 159 speech bits, there are 7 padding bits added to the RTP payload. A RTP packet is formed by adding a 12 byte RTP header to the RTP payload for conveying information such as RTP sequence number, time stamp, M and X fields, synchronization source ID, etc.

In UDP/IPv6 layer 215, an 8 byte UDP header and a 40 byte IP header are added to the RTP packet to produce a UDP/IPv6 packet. The UDP header indicating source/destination port numbers and a UDP checksum, and the IP header indicating the source/destination IP addresses. Thus, over 60 bytes of overhead in the form of headers and other information are added by the RTP and UDP/IPv6 layers 210, 215 to the original 159 bit speech frame resulting in an bit size increase of over 300%.

The UDP/IPv6 packet is sent from VoIP phone 110 through internet 105 to GGSN 120. From GGSN 120, the UDP/IPv6 packet is forwarded to SGSN 125 and then to RAN 160. Fortunately, once the UDP/IPv6 packet reaches RAN 160, it is no longer necessary to transmit the complete RTP/UDP/IPv6 header for each speech packet over an air interface because much of the information conveyed in the RTP/UDP/IPv6 header is static. After the intended receiver, e.g., UE 140, has acquired all the static information in the RTP/UDP/IPv6 header, the RTP/UDP/IPv6 header can be compressed in PDCP layer 220 using Robust Header Compression (RoHC) to form a PDCP packet comprising of the RTP payload and a compressed header. The compressed header containing dynamic information in the RTP/UDP/IPv6 header, such as the RTP sequence number, time stamp, M and X fields, and UDP checksum. In most situations, the RTP/UDP/IPv6 header can be compressed into 3 bytes. Specifically, the RTP header can be compressed down to 1 byte for indicating the 6 least significant bits (LSB) of the sequence number. The UDP header can be compressed down to 2 bytes corresponding to the UDP checksum. In other situations, the compressed header cannot be compressed down into 3 bytes because some of the lesser dynamic information in the RTP/UDP/IPv6 header would need to be updated at the receiver, for example, during resynchronization or at the beginning of talk spurts. Note that, in the latter situations, it is possible that the RTP/UDP/IPv6 header is not compressed at all. When the RTP/UDP/IPv6 header is not compressed, then the PDCP packet would comprise of the RTP payload and the uncompressed RTP/UDP/IPv6 header.

In RLC layer 225, a 1 byte RLC UM header is added to the PDCP packet to produce an RLC packet, wherein the RLC UM header includes a RLC sequence number. The RLC packet is subsequently processed in MAC-d layer 230 and PHY layer 235 before being transmitted via Node B to UE 140 over an air interface.

Although the 60 byte RTP/UDP/IPv6 header can be reduced to 3 bytes in most situations, current implementations of VoIP over downlink Dedicated CHannels (DCH) would not benefit from the compression because the DCH are currently configured using Orthogonal Variable Spreading Factor (OVSF) codes sufficient to accommodate peak data rate on the DCH. For example, when RTP/UDP/IPv6 header compression is optimal, i.e., header reduced to 3 bytes, then an OVSF code with a Spreading Factor (SF) of 128 would be sufficient to accommodate traffic on the downlink DCH. However, when RTP/UDP/IPv6 header compression is not optimal, such as during call set-up or resynchronization, then an OVSF code with a SF lower than 128 would be required. Current implements of VoIP would probably need to use an OVSF code with a SF less than 128 to accommodate the data rate associated with non-optimal RTP/UDP/IPv6 header compression. As is well known in the field of wireless communications networks, communication channels configured with higher SFs result in a more efficient use of system resources, e.g., bandwidth, and an increase in system capacity.

It has been suggested that a data rate of 39.2 kbps is an appropriate peak data rate for VoIP on the downlink DCH. To achieve this data rate, an OVSF code with a SF of 64 is required for channel configuration. By contrast, in conventional CS voice, an OVSF code with a SF of 128 is sufficient to accommodate peak data rate on the DCH. The resources used to support a channel configured using a 64 OVSF code (i.e., OVSF code with a SF of 64) is equal to the resources used to support two channels configured using 128 OVSF codes (i.e., OVSF code with a SF of 64). Thus, VoIP on downlink DCH can reduce system capacity by 50% compared to conventional CS voice from a bandwidth allocation perspective.

In addition to overhead being added via headers, signaling associated with VoIP is also added. VoIP requires additional signaling such as Real Time Control Protocol (RTCP) and the Session Initiation Protocol (SIP). This additional signaling can result in the multiplexing of up to four transport channels (including the downlink DCH over which the speech frame is transmitted): a first transport channel for Signaling Radio Bearer (SRB); a second transport channel for carrying speech, i.e., DCH; a third transport channel for RTCP; and a fourth transport channel for SIP. Each of these channels are associated with multiple data rates. SRB being associated with data rates of 0 and 3.4 kbps. Speech being associated with data rates of 0, 16 and 39.2 kbps (where the 39.2 kbps data rate corresponds to a packet with uncompressed RTP/UDP/IPv6 header). And RTCP and SIP being associated with data rates of 0, 8 and 16 kbps. The activity on each of these channels can lead to significant data rate variations. Given that it is unlikely the transport channels will all require their associated maximum data rate simultaneously, configuring the transport channels using OVSF codes sufficient to accommodate the maximum data rate would be an inefficient use of system resources. Accordingly, there exists a need to minimize the adverse effects on system resources associated with implementing VoIP over downlink DCH.

SUMMARY OF THE INVENTION

The present invention is a method and system thereof for transmitting a Voice over Internet Protocol (VoIP) packet over a primary channel and a supplemental channel belonging to a shared pool of supplemental channels in a wireless communications network such that Orthogonal Variable Spreading Factor (OVSF) codes associated with higher spreading factors (SF) may be used, thereby minimizing the adverse effects on system resources associated with implementing VoIP over downlink Dedicated CHannels (DCH). The VoIP packet being a packet having speech bits and processed in accordance with VoIP techniques, and the primary and supplemental channels having dedicated physical data channels. In the present invention, if an entire VoIP packet cannot be transmitted over a single transmission time interval on a primary channel, a specific supplemental channel (or code associated therewith) is assigned to a User Equipment (UE) to which the VoIP packet is intended. A portion of the VoIP packet is transmitted to the UE over a Dedicated Physical Data CHannel (DPDCH) on the primary channel, and another portion of the VoIP packet is transmitted to the UE over a DPDCH on the supplemental channel. The UE examines the DPCCH on the primary channel to determine whether a specific supplemental channel (or code associated therewith) has been assigned to it. If a specific supplemental channel (or code) was assigned, then the UE will decode the data on the assigned specific supplemental channel along with the data on its primary channel. Otherwise, the UE will only decode the data on its primary channel.

In one embodiment, the assigned specific supplemental channel (or code associated therewith) belongs to a set of supplemental channels assigned to the UE, and the set of assigned supplemental channels belongs to a shared pool of supplemental channels (or codes) at Node B. The identity of the assigned specific supplemental channel (or code) is indicated to the UE over a Dedicated Physical Control CHannel (DPCCH) on the primary channel. In a preferred embodiment, both the primary and supplemental channels are configured using Orthogonal Variable Spreading Factors (OVSF) codes with the same Spreading Factors (SF), such as 128.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention is a system and a method for delivering Voice over Internet Protocol (VoIP) service over a downlink Dedicated CHannel (DCH) using a shared pool of supplemental channels to transmit a portion of a VoIP packet when the entire VoIP packet cannot be transmitted, for example, over a single transmission time interval on the DCH. The present invention is being described herein with reference to a wireless communications network implemented in accordance with the well-known Universal Mobile Telecommunications System (UMTS) standard. It should be understood that the present invention is equally applicable to wireless communications networks implementing other multiple access technology. Additionally, it should be noted that the term "supplemental channel", as used in this application, refers to a second Dedicated Physical Data CHannel (DPDCH) as used in multi-code concept in UMTS, or some equivalent communication channel in some other multiple access technology, and the term VoIP packet refers to a packet having speech bits and processed in accordance with VoIP techniques.

Figure 3:
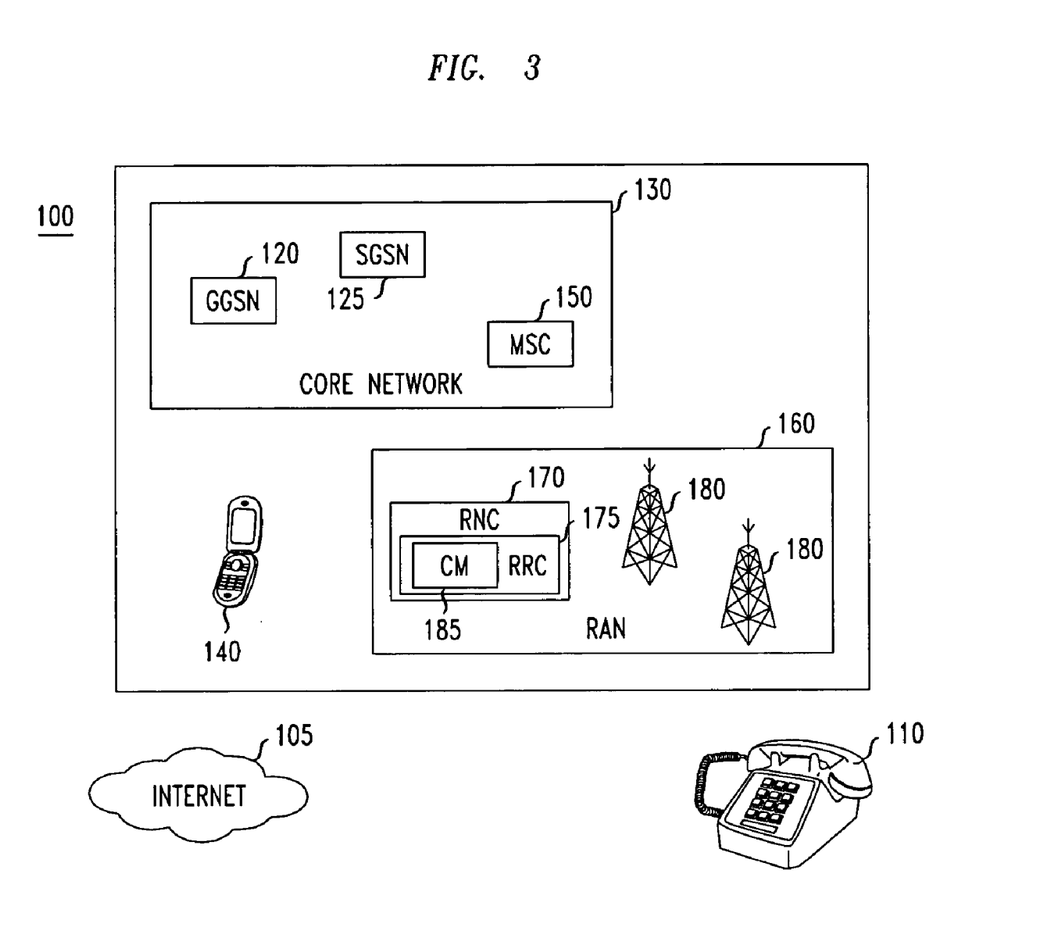
FIG. 3 depicts a UMTS based wireless communications system in accordance with the present invention.

FIG. 3 depicts a UMTS based wireless communications system 300 in accordance with the present invention. Wireless communications system 300 comprises at least core network 130, Radio Access Network (RAN) 160, and User Equipment (UE) or mobile station 140. The core network 130 includes Gateway GPRS Support Node (GGSN) 120, Serving GPRS Support Node (SGSN) 125, and Mobile Switching Center (MSC) 150. GGSN 120 is an interface between internet 105 and core network 130, while SGSN 125 is an interface between core network 130 and RAN 160. The Radio Access Network (RAN) 160 includes one or more Radio Network Controller (RNC) 170 and one or more Node B (or base station) 180. RNC 170 includes a Radio Resource Control (RRC) 175. RRC 175 having functionalities for managing radio resources, including a Code Manager (CM) 185. CM 185 include functionalities for managing Orthogonal Variable Spreading Factor (OVSF) codes for each Node B 180 connected to RNC 170.

Communication channels between Node B and UE 140 are configured using a multitude of Orthogonal Variable Spreading Factor (OVSF) codes. For VoIP calls, CM 185 assigns a OVSF code to UE 140 for configuring a downlink Dedicated CHannel (DCH). The DCH and OVSF codes being used to configure the DCH are also referred to herein as a "primary channel" and a "primary OVSF code", respectively. In UMTS, the DCH includes a Dedicated Physical Data CHannel (DPDCH) and a Dedicated Physical Control CHannel (DPCCH).

Depending on the capabilities of UE 140, CM 185 may also assign a set of N OVSF codes to UE 140 for configuring a set of N supplemental channels in accordance with multi-code techniques in UMTS, where N is some integer greater or equal to one. In one embodiment, the supplemental channel may comprise only of a DPDCH. In another embodiment, the supplemental channel may comprise only of a DPDCH and a DPCCH. In yet another embodiment, the supplemental channel may comprise of at least a DPDCH and, possibly, a DPCCH. Note that hereinafter the term "supplemental OVSF codes" will be used to refer to OVSF codes that support supplemental channels. In a preferred embodiment, the primary and supplemental OVSF codes have the same SF, such as 128.

Basically, if UE 140 is capable of simultaneously supporting, e.g., decoding, two or more DPDCHs; then CM 185 can assign a set of N supplemental OVSF codes to UE 140. Such a UE is referred to herein as a "multi-code UE". Otherwise, if UE 140 is not a multi-code UE, then CM 185 does not assign any supplemental OVSF codes to UE 140.

The set of N supplemental OVSF codes assigned to UE 140 are selected from a set of M supplemental OVSF codes, wherein M is greater than or equal to N. The set of M supplemental OVSF codes being a set of OVSF codes reserved by CM 185 at Node B 180, and being associated with a shared pool of supplemental channels (or OVSF codes) at Node B 180. Using supplemental OVSF codes from a pool of OVSF codes shared amongst UEs is one of the fundamental concepts of the present invention. Note that, in accordance with the present invention, there will be a set of M supplemental OVSF codes reserved by CM 185 for each Node B. The supplemental OVSF codes reserved at one Node B may include some, all or none of the supplemental OVSF codes reserved at another Node B. In a preferred embodiment, the parameter M should be chosen to balance between minimizing excessive supplemental OVSF code reservation and the possibility that more than M supplemental OVSF codes may be simultaneously required. The parameter M may be static or dynamically determined depending on system metrics such as load, supplemental OVSF code usage, etc. The parameter N should be chosen based on a variety of factors, such as keeping Transport Format Combination Set (TFCS) a reasonable size, limiting UE complexity, and the capabilities of UE. In one embodiment, the parameter N is set equal to 3 for multi-code UEs capable of 384 kbps, 768 kbps and 2048 kbps data rates.

Figure 4:
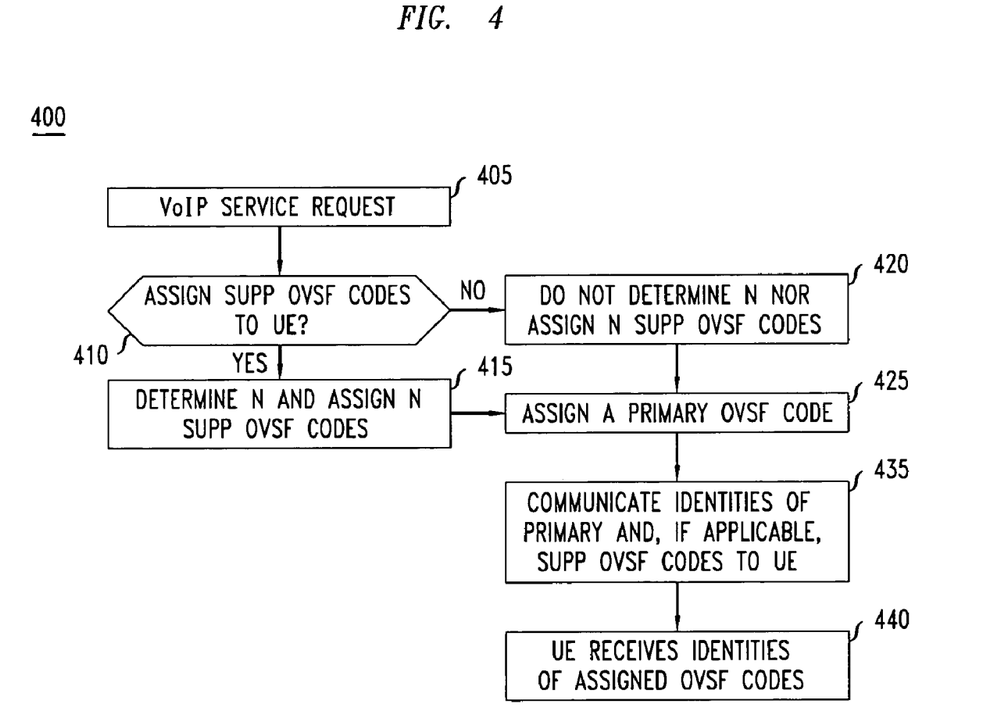
FIG. 4 depicts a flowchart illustrating call set-up procedures for implementing VoIP service over a downlink Dedicated CHannel (DCH) using a shared pool of supplemental channels in accordance with the present invention.

FIG. 4 depicts a flowchart 400 illustrating call set-up procedures for implementing Voice over Internet Protocol (VoIP) service over a downlink DCH using a shared pool of supplemental channels in accordance with the present invention. In step 405, VoIP service is being requested for UE 140. In step 410, RRC 175 determines whether supplemental OVSF codes are to be assigned to UE 140 based on the capabilities of UE 140. Basically, if UE 140 is a multi-code UE, then RRC 175 determines supplemental OVSF codes are to be assigned to UE 140. If it is determined that supplemental OVSF codes are not to be assigned to UE 140, then in step 420 RRC 175 does not determine a value for the parameter N nor does CM 185 assign any supplemental OVSF codes to UE 140. From step 420, flowchart 400 proceeds to step 425 where CM 185 assigns a primary OVSF code to UE 140.

On the other hand, if supplemental OVSF codes are to be assigned to UE 140, then in step 415 RRC 175 determines a value for the parameter N and CM 185 assigns N supplemental OVSF codes to UE 140. The N supplemental OVSF codes being selected from the set of M supplemental OVSF codes. From step 415, flowchart 400 continues to step 425 where CM 185 assigns a primary OVSF code to UE 140. In step 435, RNC 170 communicates via Node B 180 the identities of the assigned primary OVSF code and, if applicable, the identities of the N supplemental OVSF codes to UE 140 over a Dedicated Control Channel (DCCH). In step 440, UE 140 receives the identities of the primary and supplemental OVSF codes (if applicable). UE 140 will now begin to store the data being received over primary and supplemental channels, i.e., the multiple DPDCHs, configured with the primary and supplemental OVSF codes. UE 140 will decode the data on the primary channel. If UE 140 is a multi-code UE and was assigned supplemental OVSF codes, UE 140 will not decode the data on any of the associated supplemental channels unless it receives some type of indication to decode a specific supplemental channel, as will be described herein.

Figure 5:
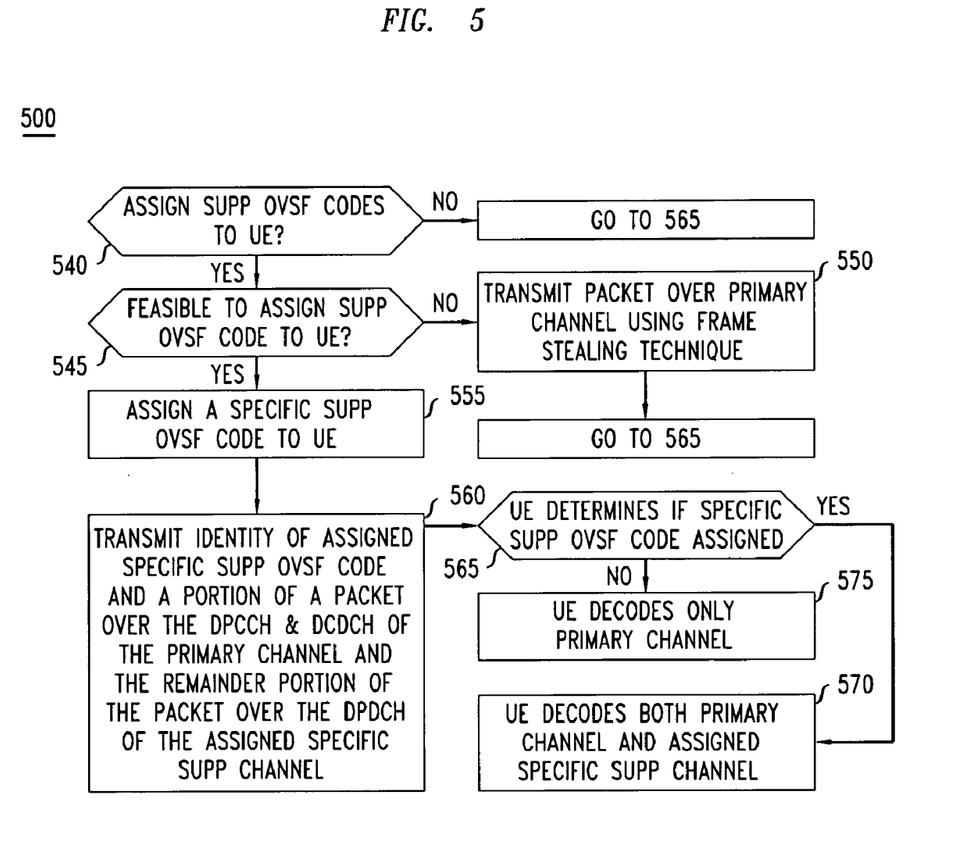
FIG. 5 depicts a flowchart illustrating an in-progress VoIP call over a downlink DCH in accordance with the present invention.

After call set-up is completed, UE is ready to receive VoIP calls. FIG. 5 depicts a flowchart 500 illustrating an in-progress VoIP call over a downlink DCH in accordance with the present invention. In step 540, RNC 170 receives a packet from RAN 160 and determines whether a supplemental channel should be used, in addition to the primary channel, for the transmission of the packet to UE 140. Basically, a supplemental channel should not be used if the packet includes one of these combinations: speech, compressed RTP/UDP/IPv6 header and SRB; SIP and SRB; or RTCP and SRB. A supplemental channel should be used if the packet includes one of these combinations: speech, uncompressed RTP/UDP/IPv6 and SRB; or speech, compressed RTP/UDP/IPv6 header, SRB and SIP. In one embodiment, determining whether a supplemental channel should be used is based on the size of the packet. More specifically, a supplemental channel should be used if the packet cannot be transmitted over the DCH in a single Transmission Time Interval (TTI), e.g., 20 ms. If it is determined that a supplemental channel should not be used for the packet transmission, then flowchart 500 continues to step 565.

If it is determined that a supplemental channel should be used for the packet transmission, then in step 545 CM 185 determines whether it would be feasible to assign a supplemental OVSF code to UE 140. In one embodiment, if a set of N supplemental OVSF codes had been assigned to UE 140, CM 185 checks to see if any of those supplemental OVSF codes are currently available, i.e., not currently being used by another UE. If a set of N supplemental OVSF codes had not been assigned to UE 140 or if none of the assigned N supplemental OVSF codes are currently available, then it is determined that it would not be feasible to assign a supplemental OVSF code to UE 140 and flowchart 500 continues to step 550. In step 550, a well-known technique referred to as frame stealing is used by RNC 170 to transmit the packet (after it has been further processed in subsequent protocol layers) via Node B to UE 140 over the primary channel only. As is well-known, frame stealing is a technique which blanks out speech frames and sends the control information (which is a part of the overhead information) in its place. Frame stealing will result in lost speech frames which may adversely affect speech quality. From step 550, flowchart 500 continues to step 565.

If, on the other hand, it is determined that it would be feasible to assign a supplemental channel to UE 140, flowchart 500 continues to step 555 where CM 185 assigns a specific supplemental OVSF code from the assigned set of N supplemental OVSF codes. Upon assigning the specific supplemental OVSF code, in step 560, RNC 170 transmits via Node B a portion of the packet (after it has been further processed in subsequent protocol layers) and the identity of the assigned specific supplemental OVSF code (or an indication of the supplemental OVSF code or supplemental channel associated therewith) over the DPDCH and DPCCH of the primary channel, respectively, and another portion of the packet (after it has been further processed in subsequent protocol layers) over the DPDCH of a supplemental channel configured with the specific supplemental OVSF code. Preferably, the identity of the assigned specific supplemental OVSF code and both portions of the packet are sent concurrently. In other embodiments, the identity of the assigned specific supplemental OVSF code may be sent earlier or later than both portions of the packet.

In one embodiment, the identity of the specific supplemental OVSF code is conveyed using Transport Format Combination Index (TFCI) field on the DPCCH of the DCH. Note that the TFCI usually only indicates a frame size, e.g., 300 bits. In this embodiment of the present invention, the TFCI will indicate both a frame size and, if applicable, an assigned specific supplemental OVSF code. For example, a TFCI of 1 might indicate a frame size of 300 bits and no assigned specific supplemental OVSF code, whereas a TFCI of 4 might indicate a frame size of 600 bits and the assigned specific supplemental OVSF code from the set of assigned N supplemental OVSF codes. The assigned specific supplemental OVSF code may be indicated by its relative position in the set of N supplemental OVSF codes, e.g., first supplemental OVSF code in the set of N supplemental OVSF codes, or indicated by referencing its unique identity, e.g., supplemental OVSF code 67. A TFCI mapping table may be provided to UE 140 during call set-up to indicate to the mapping for the TFCI. That is, when UE 140 receives a TFCI, it will reference the TFC mapping table to determine the appropriate TFC and, if applicable, supplemental OVSF code. The TFC mapping table being a lookup table or similar for, at least, a TFCI to frame size and supplemental OVSF code, if applicable.

Flowchart 500 continues to step 565. In step 565, assuming UE 140 is a multi-code UE, UE 140 decodes the control information on the DPCCH of the primary channel to determine whether one of the supplemental OVSF codes (from the set of N supplemental OVSF codes) has been assigned to it. In one embodiment, if the identity of a supplemental OVSF code has been indicated in the control information, then UE 140 will determine that the supplemental OVSF code indicated in the control information has been assigned to it. Otherwise, UE 140 will determine that no supplemental OVSF code has been assigned to it.

Note that UE 140 will always decode the data on the DPDCH of the primary channel. If the control information indicates the identity of a specific supplemental OVSF code (or supplemental channel) being used to send data, then UE 140 also decodes the data on the DPDCH on the identified supplemental channel and discards the data on the other supplemental channels. If the control information indicates that data exists only on the primary channel, UE 140 discards the data on all supplemental channels.

If UE determines that a supplemental OVSF code has been assigned to it, then flowchart 500 continues to step 570 where UE 140 will decode the data on the DPDCH of the assigned supplemental channel in addition to decoding the data on the DPDCH of its primary channel. Otherwise, flowchart 500 continues to step 575 where UE 140 will decode data on the DPDCH of its primary channel but not on the DPDCH of any of its assigned set of N supplemental channels.

When the VoIP call is in-progress, UE 140 may move from a coverage area of a Node B (also referred to herein as "current Node B") associated with one RNC to a coverage area of a Node B 180 (also referred to herein as "new Node B") associated with another RNC. The former RNC is referred to herein as a "serving RNC" or "S-RNC", and the latter RNC is referred to herein as a "drifting RNC" or "D-RNC". In this situation, a number of issues may arise if soft handoff is utilized. The first issue is that two different RNCs now have control over Node B resources. The second issue is that there is only limited option of fast signaling of code status information over a connection referred to herein as an "Iur" connection between the S-RNC and D-RNC.

Some options for addressing these issues are as follow. The first option is avoid soft handoff of UE 140 from the current Node B to the new Node B. UE 140 will maintain its radio link with the current Node B until the radio link quality with the new Node B is better. When such an event occurs, a hard handoff is performed from the current Node B to the new Node B. The second option is to perform Serving Radio Network Subsystem (SRNS) relocation. In SRNS relocation, the connection between the S-RNC and the core network (hereinafter referred to as "Iu connection") is relocated to the D-RNC. This second option can be combined with the first option, i.e., hard handoff combined with SRNS relocation.

The third option involves restricting UE 140 to a primary OVSF code. In this option, supplemental OVSF code allocation can no longer be implemented and techniques such as frame stealing would be implemented when the situation calls for it, e.g., situation which would trigger a need for a supplemental channel. The last option involves assigning a fixed supplemental OVSF code to UE 140.

Although the present invention has been described in considerable detail with reference to certain embodiments, other versions are possible. For example, the sequence of the steps in flowcharts 400 and 500 may be different. Codecs other than AMR may be used. Data applications other than VoIP may be used. Therefore, the spirit and scope of the present invention should not be limited to the description of the embodiments contained herein.

The invention claimed is:

1. A method for transmitting a packet to a receiver over a primary and supplemental channel in a wireless communications network, the method comprising the steps of: communicating from radio network node indications of a primary code and a set of N supplemental codes assigned to the receiver over a control channel; determining at the radio network node whether a packet should be transmitted over a supplemental channel; and when the packet should be transmitted over a supplemental channel, transmitting a first portion of the packet and a supplemental channel indicator over a same single packet transmission time interval on the primary channel and transmitting a second portion of the packet over the same single packet transmission time interval on the which corresponds to the supplemental channel indicator, wherein the supplemental channel is configured using an assigned specific supplemental code belonging to the set of N supplemental codes assigned to the receiver; and when the packet should not be transmitted over a supplemental channel, transmitting the packet over the primary channel.

2. The method of claim 1, wherein the packet is a Voice over Internet Protocol (VoIP) packet and the primary channel is a Dedicated CHannel (DCH).

3. The method of claim 1, wherein prior to the step of transmitting the first and second portions of the packet and the supplemental channel indicator over the primary and supplemental channels;
assigning the set of N supplemental codes to the receiver as a subset of a set of M supplemental codes, where the set of M supplemental codes are reserved at a transmitter and dynamically shared amongst multiple receivers.

4. The method of claim 3, comprising the additional step of assigning a specific supplemental code to the receiver if one of the supplemental codes in the set of N supplemental codes is currently available.

5. The method of claim 4, wherein the supplemental channel indicator is transmitted as part of a Transport Format Combination Index (TFCI) on the DPCCH.

6. The method of claim 1, wherein the first and second portions of the packet are transmitted over Dedicated Physical Data CHannels (DPDCHs) on the primary and supplemental channels, and the supplemental channel indicator is transmitted over a Dedicated Physical Control CHannel (DPCCH) on the primary channel.

7. The method of claim 1 comprising the additional step of:
when the receiver is moving from a first coverage area of a first Node B associated with a serving RNC to a second coverage area of a second Node B associated with a drifting RNC,
performing a hard handoff of the receiver from the first Node B to the second Node B, or
restricting the receiver to the primary channel only, or
assigning a fixed supplemental channel to the receiver.

8. The method of claim 1 comprising the additional steps of:
decoding at the receiver the first and second portions of the packet transmitted on the primary and supplemental channels if there exist a supplemental channel indicator on the primary channel for a same single packet reception time interval indicating the supplemental channel; and
decoding at the receiver only the packet transmitted on the primary channel if there does not exist a supplemental channel indicator on the primary channel for the same single reception time interval.

9. The method of claim 1, wherein the primary and supplemental channels are configured using Orthogonal Variable Spreading Factors (SF) with identical Spreading Factors (SF).

10. The method claim 1, wherein it is determined that the packet should be transmitted over a supplemental channel if the packet cannot be transmitted over a single transmission time interval on the primary channel.

11. A method of receiving data transmitted over an air interface of a wireless communications network comprising the steps of: receiving at a receiver indications of a primary channel and a set of N supplemental channels over a control channel; receiving at the receiver data transmitted over the primary channel and a subset of the set of N supplemental channels, wherein the primary channel is configured using a primary code and the subset of the set of N supplemental channels is configured using a subset of a set of N supplemental codes; decoding at the receiver the data received over a same single packet reception time interval on the primary channel; and decoding the data received on a specific supplemental channel if a supplemental channel indicator received over a same single packet reception time interval on the primary channel indicates the specific supplemental channel, the specific supplemental channel belonging to the subset of the set of N supplemental channels; and not decoding any of the data received on any of the subset of the set of N supplemental channels if no supplemental channel indicator was received over the same single packet reception time interval on the primary channel.

12. The method of claim 11, wherein wireless communications network is based on Universal Mobile Telecommunications System (UMTS), the data is a Voice over Internet Protocol (VoIP) packet, and the primary and supplemental codes are Orthogonal Variable Spreading Factor (OVSF) codes.

13. A method for transmitting a packet to a receiver over a primary and supplemental channel in a wireless communications network comprising the steps of: transmitting from the wireless network node a first portion of the packet and a supplemental channel indicator over a same single packet transmission time interval on a primary channel configured using a primary code and transmitting a second portion of the packet over the same single packet transmission time interval on a supplemental channel configured using an assigned specific supplemental code and corresponding to the supplemental channel indicator if the receiver is capable of simultaneously supporting the primary and supplemental channels for a corresponding same single packet reception time interval, wherein the assigned specific supplemental code belongs to a set of N supplemental codes assigned to the receiver; and transmitting from the wireless network node the packet over a primary channel configured using frame stealing techniques if the receiver is not capable of simultaneously supporting the primary and supplemental channels.

14. A wireless communications network comprising:
a radio network controller for assigning a primary code and a set of N supplemental codes to a receiver and for assigning a specific supplemental code from the set of N supplemental codes; and
a base station for transmitting a packet and indications of assigned primary and at least one supplemental channel to the receiver over a same single packet transmission time interval,
wherein a first portion of the packet and a supplemental channel indicator is transmitted over the same single packet transmission time interval on a primary channel configured using the assigned primary code and a second portion of the packet is transmitted over the same single packet transmission time interval on a supplemental channel corresponding to the supplemental channel indicator, the supplemental channel configured using the assigned specific supplemental code if the receiver is capable of simultaneously supporting the primary and supplemental channels for a corresponding same single packet reception time interval, wherein the packet is transmitted over the primary channel configured using the assigned primary code using frame stealing techniques if the receiver is not capable of simultaneously supporting the primary and supplemental channels.

15. The wireless communications network of claim 14 further comprising:

a receiver for receiving data simultaneously transmitted over the primary and supplemental channels for the same single packet transmission time interval, wherein the receiver is operable to decode the supplemental channel for the corresponding same single packet reception time interval if the supplemental channel indicator was received over the corresponding same single packet reception time interval on the primary channel.

16. A mobile station capable of supporting multiple data channels configured using different codes comprising: a receiver for receiving data transmitted over a primary channel and a set of N supplemental channels, wherein the primary channel is configured using a primary code and the set of N supplemental channels is configured using a set of N supplemental codes, the receiver configured to receive indications of the primary code and the set of N supplemental codes over a control channel; and a decoder capable of decoding the data received on the primary channel for a same single packet reception time interval, and of decoding the data received on an assigned specific supplemental channel when a supplemental channel indicator received over the same single packet reception time interval on the primary channel indicates the specific supplemental channel, wherein the specific supplemental channel belongs to the set of N supplemental channels.

* * * * *